SEMICONDUCTOR FILM RESISTOR

Filed Jan. 10, 1962 4 Sheets-Sheet 1

INVENTOR
FRANKLYN M. COLLINS
BY Edmund W. Bopp
Agent

INVENTOR
FRANKLYN M. COLLINS
BY Edmund W. Bopp
Agent

SEMICONDUCTOR FILM RESISTOR

Filed Jan. 10, 1962

INVENTOR
FRANKLYN M. COLLINS
BY Edmund W. Bopp
Agent

INVENTOR
FRANKLYN M. COLLINS
BY Edmund W. Bopp
Agent

United States Patent Office 3,240,625

Patented Mar. 15, 1966

3,240,625

SEMICONDUCTOR FILM RESISTOR

Franklyn M. Collins, Lewiston, N.Y., assignor to Air Reduction Company, Incorporated, a corporation of Delaware Filed Jan. 10, 1962, Ser. No. 165,431
13 Claims. (Cl. 117—213)

This invention relates to film type electrical resistors and to apparatus and methods for manufacturing the same, and more particularly to resistors formed by films of semiconductors, such as silicon and germanium.

Fixed value resistive elements in the form of thin films on insulating supporting substrates are commonly prepared from materials which are highly conductive, such as the metals, which have resistivities in the neighborhood of $10^{-5}$ ohm-centimeters, or the semimetals, in the neighborhood of $10^{-3}$. Metals or semimetals have been used because they were regarded as the only materials from which films of sufficiently stable electrical characteristics, as evidenced by the amount of change of resistance under different operating conditions, could be obtained. The use of highly conductive materials, however, severely handicaps the preparation of film resistive elements having high resistance values. In the form of sufficiently thin films to provide the higher resistance values required in many circuit applications, these materials do not have the necessary electrical stability, i.e., the resistance will not remain fixed within the permissible limits under varying conditions of temperature, humidity, applied voltage, etc.

In commercial practice with the metal and semimetal films, because of their inherently low resistance values as deposited, it is necessary to resort to methods of scribing or cutting the film into a pattern giving a long narrow conducting path. This method is technically difficult and expensive for providing the higher resistance values.

Some of the conductive materials commonly used to form resistive films are carbon, which has a specific resistance of about 0.001 ohm-cms., chrome-nickel alloy with a specific resistance of about 0.0001 ohm-cms., and tin oxide with a specific resistance of about 0.002 ohm-cms.

I prefer to utilize films of semiconductors such as silicon and germanium or mixtures of the two. The use of a film of essentially pure silicon of specific resistance 0.02 ohm-cms. permits resistance values to be obtained at least ten times as high as the conductive materials above mentioned for the same thickness of film.

It will be readily appreciated that thin films of any material may be inherently unstable electrically. I have found that a film of semiconductive material such as silicon has a comparable stability with the commonly used conductors for the same thickness of film, over a wide range of thicknesses. Because of its greater resistivity, a thicker, more stable film may be used to provide a given resistance value, or a film having a higher resistance can be obtained with a film of given thickness.

I have found that, to secure the desired specific resistance together with good stability in a film of semiconductor, it is necessary to form and deposit the film under carefully controlled conditions. In particular, I have found that a suitable resistivity of the film may be coupled with a minimum value of the temperature coefficient of resistance. This result has been found to occur when the substrate is maintained at a temperature within a certain critical range while the film is being deposited. For silicon, this temperature range extends between about 600° C. and 700° C., although for less satisfactory results a range from about 500° C. to 1000° C. may be used. Best results have been obtained in the neighborhood of 650° C. Films deposited upon substrates held at higher or lower temperatures than about 650° C. generally will be higher in resistance but are likely to be unstable.

I have found that very careful attention must be given to the purity and cleanliness of the vacuum chamber if the depositing is done in vacuum, and to the material and cleanliness of the crucible if a method of thermal evaporation is employed, otherwise the films, though high in resistance, will be very unstable.

Other features, objects and advantages will appear from the following more detailed description of an illustrative embodiment of the invention, which will now be given in conjunction with the accompanying drawings.

Figure 1:
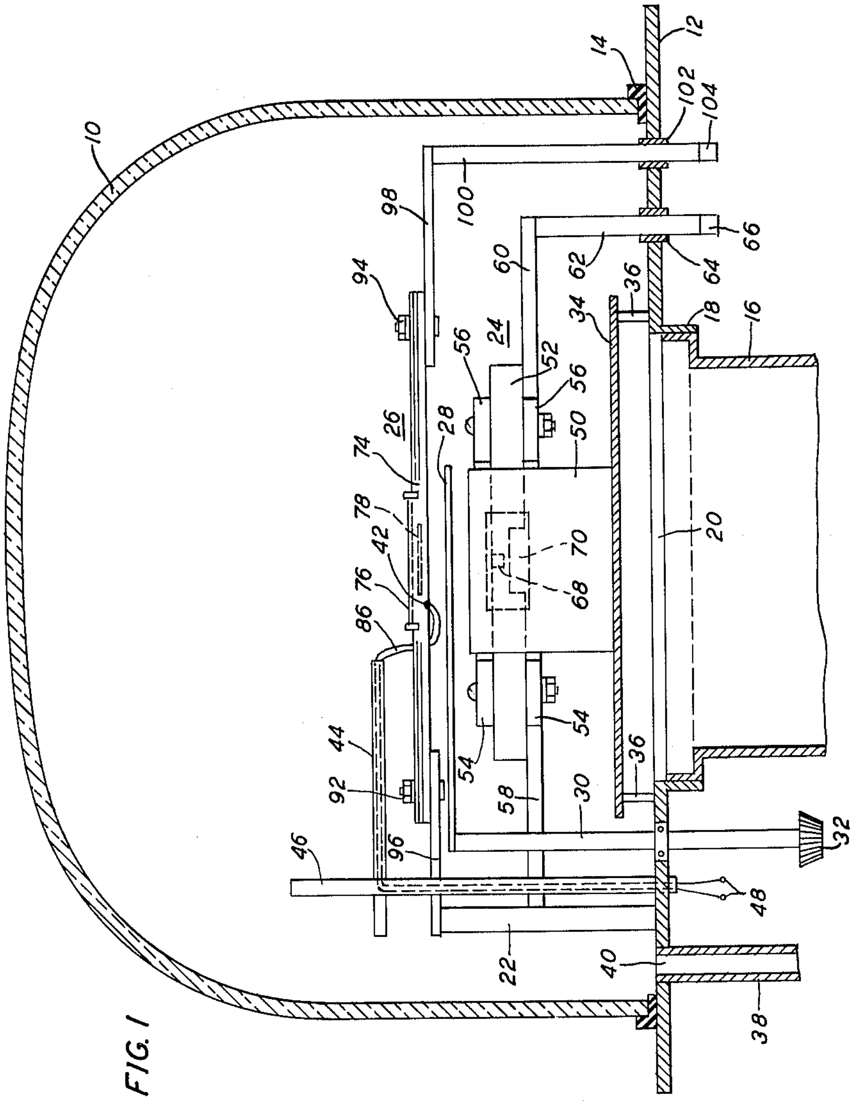
FIG. 1 is an elevational view, partly in section, of illustrative apparatus for use in practicing the invention.

FIG. 1 shows a bell jar 10 vacuum-sealed to a base plate 12 by means of a sealing ring 14. The intake port 16 of a high-vacuum pump is attached in vacuum-tight manner to an annular flange 18 surrounding an opening 20 in the base plate 12. Suitable conductive mounting members including a post 22 are provided within the bell jar 10 for mounting upon the base plate 12 a crucible holding and heating assembly 24 and a substrate holding and heating assembly 26, the crucible being supported below the substrate in position to pass rising vapor from the crucible to an exposed lower surface of the substrate. Intermediate between the crucible and the substrate there is placed a shutter 28, preferably made of stainless steel, mounted upon a rotatable shaft 30 which shaft may be turned by means of a knob 32 to move the shutter into or out of position. A baffle plate 34 mounted upon posts 36 is provided directly over the opening 20 and spaced therefrom to permit drawing a vacuum within the space under the bell jar 10 around the edge of the baffle. A tube fitted into an opening 40 in the base plate is provided for connection to a vacuum gauge. A thermocouple 42 is provided as part of the substrate assembly 26. Electrical leads from the thermocouple 42 may be brought through a horizontal tube 44 and a hollow post 46 with suitable insulating bushings to external terminals 48. A radiation shield 50 may be provided, which may consist of two semicylindrical parts arranged in front and back respectively of the crucible assembly 24.

The crucible assembly 24 comprises a combined holder and heater 52, preferably of carbon, supported in clamp members 54, 56. The clamp member 54, which is preferably of copper, is electrically an extension of a busbar 58 that is conductively connected to the post 22 which is in turn conductively connected to the base plate and serves as a ground terminal for both the crucible assembly and the substrate assembly. The clamp member 56, also preferably of copper, is electrically an extension of a busbar 60 and a conductive post 62, the latter extending through an insulating bushing 64 in the ground plate and connecting to an external busbar 66, through which heating current may be supplied to the member 52. The crucible 68 is held in a cavity in a portion of reduced section in the member 52. A radiation shield 70, which may be of molybdenum, is provided around the crucible and the central portion of the member 52.

Figure 2:
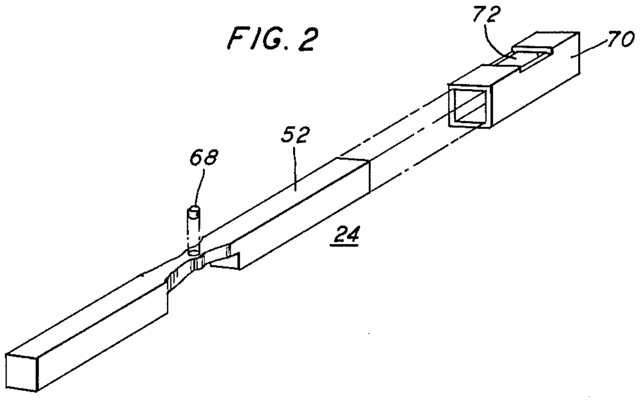
FIG. 2 is an exploded perspective view of a crucible heater assembly for use in a system according to FIG. 1, showing crucible heater, crucible, and a radiation shield.

FIG. 2 shows suitable shapes for the heating member 52, the crucible 68, and the radiation shield 70, and appropriate relative sizes for these elements. The member 52 may be reduced both in width and in height at the central portion, as shown, with a relatively thin wall of carbon forming a socket for receiving the crucible 68. The radiation shield 70 should have an opening 72 at the top, as shown, to allow vapor from the crucible to escape upward toward the substrate upon which the vapor is to be deposited. The crucible may be of small valume relatively to the bulk of the member 52 in order to provide concentrated heating of the crucible.

The substrate holding and heating assembly 26 comprises a combination holding and heating member 74, preferably made up of a plurality of copper bars, the thermocouple 42 embedded in the lowermost bar, and a radiation shield 76, preferably of molybdenum. The substrate 78 upon which a layer of resistive material is to be deposited, is held between two bars in the sub-assembly comprising the member 74, with a portion of its lower surface exposed in the direction of the crucible through openings in the lowermost bars of the member 74. The radiation shield 76 rests upon the uppermost bar of the member 74.

Figure 3:
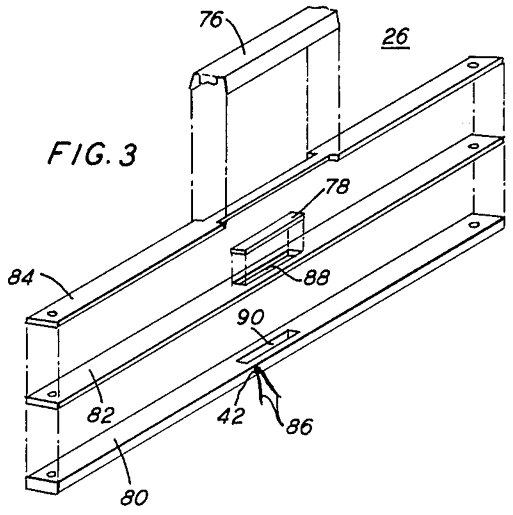
FIG. 3 is an exploded perspective view of a substrate heater assembly for use in a system according to FIG. 1, showing a three-part substrate heater, a substrate, and a radiation shield.

FIG. 3 shows suitable shapes and relative sizes of the parts of the assembly 26. The member 74 is shown as consisting essentially of three bars 80, 82, and 84. The lowermost bar 80 has embedded in it the thermocouple 42 from which extend electrical leads 86 which are shown in FIG. 1 as going to external terminals 48. The substrate 78 is supported upon the middle bar 82 with a portion of its under surfaces exposed downwardly through registering openings 88 in bar 82 and 90 in bar 80. The uppermost bar 84 cooperates to clamp the substrate 78 between this bar and the middle bar 82, and also serves to support the radiation shield 76. The bars 80, 82, and 84 may be clamped together as shown in FIG. 1 by means of bolts 92 and 94. As shown in FIG. 1, the bolt 92 serves additionally to connect one end of the member 74 to a busbar 96 which is in turn connected to the ground post 22. The bolt 94 further serves to connect the other end of the member 74 to a busbar 98 which is in turn connected to a conductive post 100. The post 100 passes through an insulating bushing 102 in the base plate 12 to connect with an external busbar 104.

The crucible 68 should be made of material which will not react with or alloy with the material which is to be heated and evaporated therein. For use with silicon or germanium of high purity, I have found that boron nitride is well suited for the purpose. This material is easily machined into the form of a thin-walled container and is highly non-reactive to silicon and germanium at temperatures up to and including the melting points of these metals and the still higher temperatures required to evaporate the contents of the crucible. The boron nitride has a melting point of about 3000° C.

In the operation of the arrangement shown in the drawings, a charge of silicon or germanium is placed in the crucible 68, and a substrate plate is inserted into the substrate heater assembly 26. With the crucible in place in the crucible heating assembly 24, and with the bell jar 10 in place on the sealing ring 14, the vacuum chamber is first pumped down to a vacuum level of about $1\times10^{-5}$ millimeters of mercury. Then the heating current is applied to the substrate heating circuit between ground and the busbar 104 to bring the temperature of the substrate up to about 650° C. for silicon or about 450° C. for germanium, and to maintain the substrate at the desired temperature for deposition. Next, with the shutter 28 in place between the substrate and the crucible, the crucible is heated by applying current between ground and the busbar 66. The crucible should be heated at a slow rate until a temperature just under the melting point of the charge is reached, and then the temperature should be held at this point for a period of time, depending in length on the degree of contamination of the system, to allow for the completion of degassing of the contents of the vacuum chamber. This is usually a period of 20 minutes or more. With continual pumping, the vacuum level should now measure about $5\times10^{-6}$ millimeters of mercury, or less, as determined by the vacuum gauge (not shown) connected to the tube 38. The power applied to the crucible heater should now be raised to a predetermined value which will result in the desired rate of evaporation of the charge. After about two minutes, the shutter 28 may be moved away by turning the knob 32, thereby allowing the vapor rising from the crucible to deposit upon the exposed portion of the lower face of the substrate. Under these conditions a coating of approximately one micron thickness will usually have been deposited after about ten minutes. When the desired thickness is attained, the shutter 28 is turned back into the shielding position, the power is shut off, and the entire apparatus is allowed to cool down to room temperature. It is then advisable to flush the vacuum chamber with dried argon gas before opening the vacuum chamber. Argon and air may be admitted to the vacuum chamber through valved lines (not shown) passing through the base plate in known manner. The bell jar may then be removed and the coated substrate may be taken out of the holder.

I have found that the process requires a vacuum at least as good as $5\times10^{-5}$ millimeters of mercury to effectively prevent reaction of the evaporating semiconductor with gaseous constituents, such as oxygen, which remain in the vacuum chamber.

Measurements were made upon several series of samples of deposited films. In the case of silicon most of the films were all about one micron in thickness. Different series of samples were made at different crucible-substrate distances. In each series, the resistance in ohms per square was measured and also the temperature coefficient of resistance, in percent per degree C. for a temperature change from room temperature to 200° C. In each series of samples, the individual samples were deposited at different substrate temperatures ranging from 550° C. to 1100° C. in the case of silicon, and from about 300° C. to 800° C. in the case of germanium.

Figure 5:
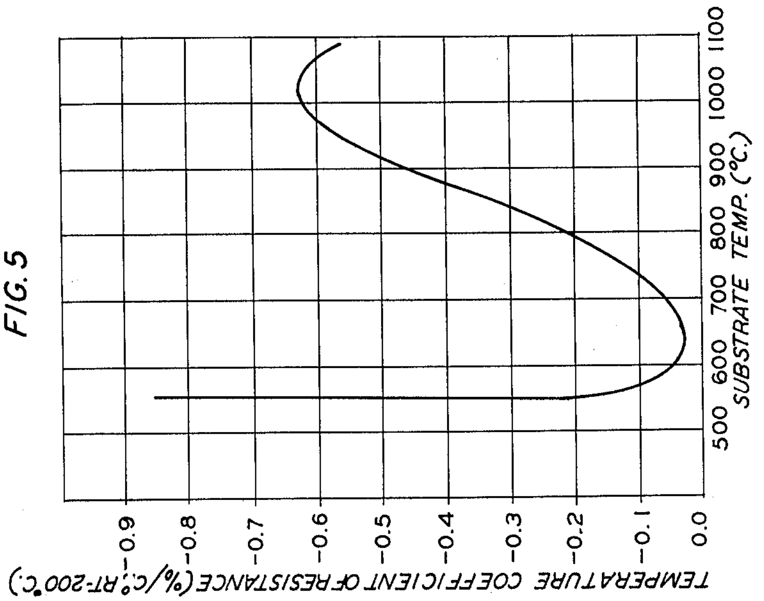
FIG. 5 is a graph of temperature coefficient of resistance vs. substrate temperature for some of the same samples of silicon film represented in FIG. 4.
Figure 4:
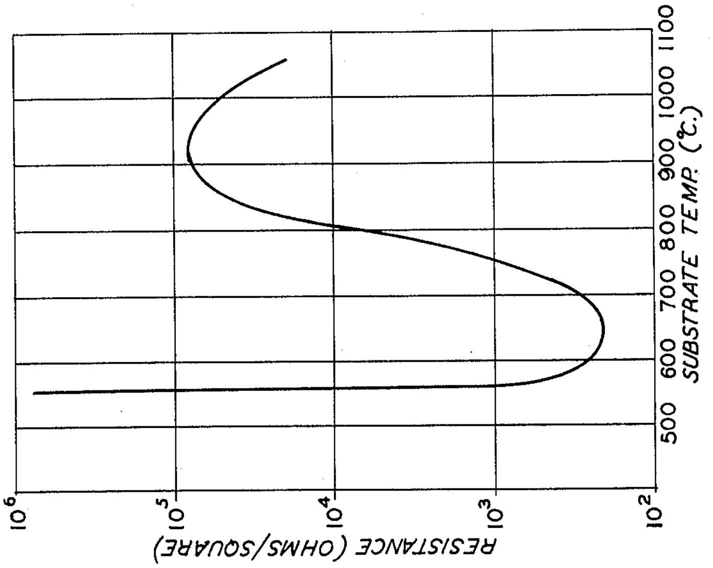
FIG. 4 is a graph of resistance vs. substrate temperature for various samples of silicon film of about one micron thickness.

FIG. 4 shows the results obtained from resistance measurements on four series of silicon films. Corresponding measurements of temperature coefficient of resistance for three of these series are shown in FIG. 5.

Figure 7:
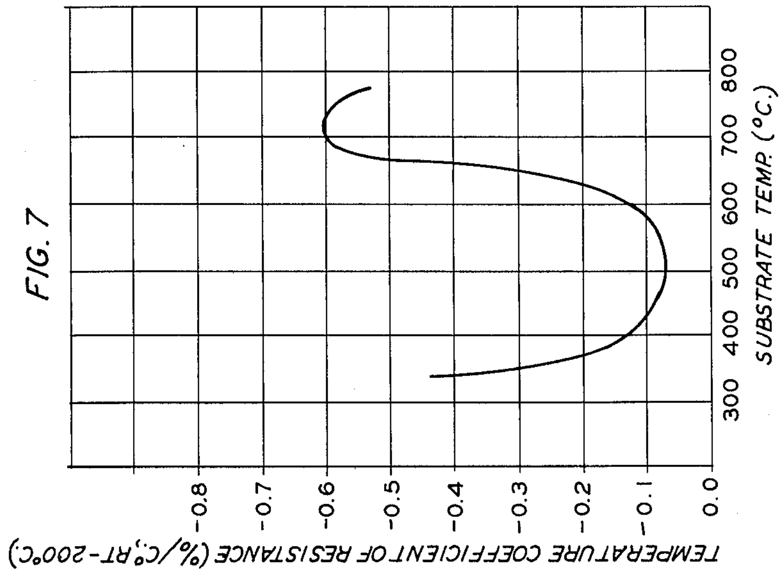
FIG. 7 is a graph of temperature coefficient of resistance vs. substrate temperature for the same samples of germanium film represented in FIG. 6.
Figure 6:
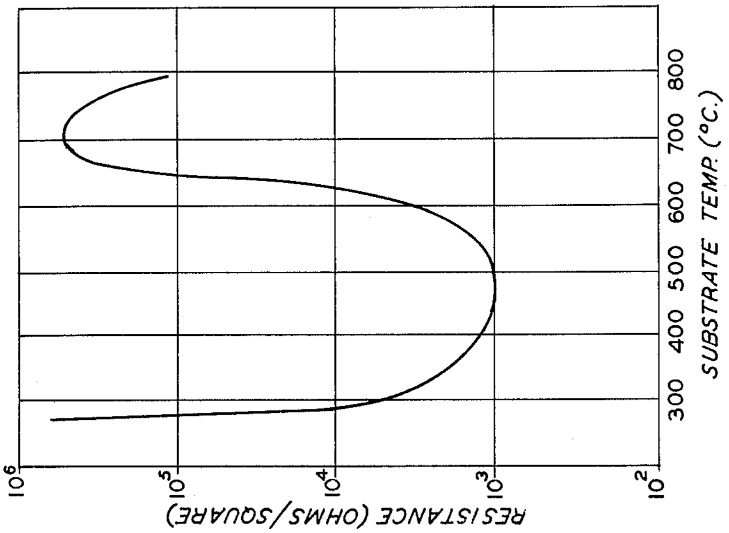
FIG. 6 is a graph of resistance vs. substrate temperature for various samples of germanium film of about one half micron in thickness.

In the case of germanium films, measurements were made upon a single series of samples all of thickness about one-half micron. FIG. 6 shows resistance values, and FIG. 7 shows corresponding values of temperature coefficient of resistance. Smooth curves have been drawn through the region of measured points in each of FIGS. 4–7.

FIG. 4 shows a minimum of resistance for silicon films corresponding to a substrate temperature of about 650° C. FIG. 5 indicates that there is also a minimum value of the temperature coefficient of resistance at about the same substrate temperature. The minimum value of the coefficient so obtained is approximately 200 parts per million per degree C.

FIG. 6 shows a similar minimum for germanium films corresponding to a substrate temperature of about 450° C. FIG. 7 shows a corresponding minimum value of the temperature coefficient of resistance also at about 450° C. and measuring approximately 700 parts per million per degree C.

Inspection of FIGS. 4 and 6 indicates that on either side of the substrate temperature for which the resistance is a minimum the resistance values rapidly become ten to one hundred or more times as great as the minimum value. At the same time, as shown by FIGS. 5 and 7, respectively, the values of the temperature coefficient become up to thirty times as large for silicon and up to nearly ten times as large for germanium.

In view of results of this type, it is advantageous to deposit silicon films at substrate temperatures about 650° C. and germanium films at substrate temperatures about 450° C.

I have found that silicon films deposited at substrate temperatures below 500° C. are metallic in appearance but poorly adherent. Those deposited in the preferred range 600° C. to 700° C. are metallic-looking and are very adherent. Films laid down at substrate temperatures of 900° C. or higher have a dull appearance as of a fine powder and are only moderately adherent. All the silicon films examined appeared orange-brown in color by transmitted light.

Microscopic examinations and studies of electron micrograph have indicated that the observed changes in resistance as a function of temperature of deposition of the film are probably attributable to varying degrees of amorphousness and crystallinity resulting at the temperature of deposition.

The very high resistivities of the films deposited at lower temperatures are probably due to the material condensing into an amorphous structure by a process analogous to freezing of a liquid under conditions not conducive to much crystallization. It is also probable that the film contains considerable amounts of occluded gases, trapped during evaporation. The extreme drop in resistivity produced by depositing at temperatures in the range 600° C. to 700° C. appears to be related to an onset of crystallinity, as confirmed by tests of X-ray diffraction. Although the crystals are very small, they can provide an adequate degree of atomic ordering to permit the passage of the requisite current. The structure is still sufficiently disordered or imperfect, however, to provide large numbers of charge carriers due to the trapping at crystalline edges, vacancies, etc.

At higher temperatures of deposition, it appears that the size, and perfection, of the crystallites increases, which should at the same time both increase the mobility of the charge carriers (tending to decrease the resistivity) and decrease the number of charge carriers originating from crystalline defects (tending to increase the resistivity). Since the resistivity is a product of the charge carrier density and charge mobility, it may be deduced that the low carrier density becomes the dominant factor at the higher deposition temperatures. However, unevenness of film thickness has been observed in samples deposited at the higher substrate temperatures, and this unevenness may also contribute to or account for the higher resistivities that are found.

I have found it necessary to keep the vacuum system extremely clean to obtain consistent results. The installation of new heating elements or accessory equipment requires initial degassing with the system at the maximum operating temperature before starting depositions. Otherwise, films deposited even at the preferred temperatures will have high resistances, up to 20,000 ohms per square or more, together with correspondingly poor values of temperature coefficient of resistance.

I have found that the necessary degassing period for a silicon charge is about 20 minutes, during which period the silicon should be held at or just below its melting point. A much longer bake-out period produces no further improvement in results, but very short periods definitely result in higher resistance film. After the silicon is degassed and brought to the evaporating temperature, the delay of about two minutes in opening the shutter to begin deposition upon the substrate produces a noticeable decrease in vacuum chamber pressure, due, probably to an efficient gettering action by the silicon vapor.

I have also found that a certain break-in period is required to achieve consistent results after a new boron-nitride crucible is introduced into the vacuum chamber. Otherwise, abnormally high resistance films result at the optimum substrate temperatures. This effect is thought to be attributable to the presence of impurities in the crucible material. This possibility was confirmed by adding a small amount of powdered elemental boron to the usual silicon charge whereupon it was found that the resistance of the film sample was increased to about 10 megohms per square, at 600° C. substrate temperature.

In an embodiment which has been built and successfully operated, electric power at about 10 volts and 100 amperes was sufficient to raise the temperature of the crucible to the usual operating temperature of about 1700° C. for silicon. With a moderate amount of additional power, crucible temperatures up to 2300° C. were readily obtained. When first heated, the carbon element will require considerable degassing, but this need will rapidly disappear in subsequent runs. Control of the crucible temperature may be had by manual adjustment of the current through the carbon element, or by any suitable automatic control means. The proper current to obtain a desired rate of evaporation of the silicon may be found by trial, and then adjusted to that value in subsequent operations. I have found that the weight of silicon deposited per unit time in a series of evaporations may be reproduced to within plus or minus 20 percent.

The boron nitride has proven very durable as a crucible material. Crucible walls less than 0.25 millimeter in thickness have been used without sign of erosion and have commonly served from 40 to 60 hours at the evaporating temperature before failing. Chemical analysis of a number of deposited silicon films have shown boron content of less than 0.5 percent.

A suitably pure silicon for charging the crucible is crushed Du Pont Hyper-Pure silicon.

I have found substrates of fused quartz to be very satisfactory. A plate of fused quartz of size about 1 inch by ¼ inch by ¹⁄₁₆ inch is suitable for many applications.

During evaporation, radiation from the silicon heater raises the substrate surface temperature markedly due to the close spacing of the elements, making necessary a comparison of the temperature determined with the thermocouple embedded in the substrate heater with a temperature measured at the surface of the quartz plate. Such a comparison can conveniently be made by checking the substrate temperature with an optical pyrometer.

The distance between the crucible and the substrate during deposition was found not to be a very critical factor in the results. Distances of an inch and a half, an inch, and a half inch were tried without substantial differences in resistance or temperature coefficient of resistance resulting at corresponding substrate temperatures. At the shorter distances, the crucible temperature was reduced somewhat in order that approximately the same amount of material would be deposited during a like period of time. At close spacing, such as one half inch, the radiant heating of the substrate by the crucible and crucible heating assembly was sufficient to raise the temperature of the substrate to about 600° C., thereby producing a film of the desired properties without need for additional substrate heating means.

The material used as the substrate was found not to be particularly critical. A number of substances, primarily ceramics, have been found to give satisfactory results at the same optimum temperatures of deposition as were found for fused quartz. For satisfactory results, the surface of the substrate must be chemically clean and must have a certain degree of smoothness. Polishing or lapping of commercial substrates may be required. In all cases, the substrate is to be chemically cleaned and heated in vacuum to the optimum temperature prior to deposition of the film.

Suitable substrate materials in addition to fused quartz include glass, alumina, magnesium oxide, steatite, zircon, forsterite, and barium titanate ceramic.

In addition to the electrical stability evidenced by low values of temperature coefficient of resistance, other indications of relative electrical stability were found under various other changes of operating conditions. For example, a film specimen which showed a decrease in resistance as low as six percent when heated from 0° C. to 200° C. was subjected to tests on the effects of changes in relative humidity, applied voltage, and on the effect of holding the specimen for a protracted period at an elevated temperature. A decrease of one percent in resistance was found after the specimen was brought from 0% relative humidity to 100% relative humidity in a period of 24 hours. A decrease of six percent in resistance was found in changing from 25 volts applied voltage up to 250 volts. The specimen was stored for 500 hours at the temperature of 200° C. with a resulting decrease of five percent in resistance.

The films of silicon or germanium can be deposited by any gas disposition technique which preserves the essential purity of the material deposited. These gas disposition techniques include, in addition to the thermal evaporation of the semiconductor in a high vacuum described herein, sputtering in an inert or reducing atmosphere, the electron-beam method of evaporation in a high vacuum, and vapor pyrolysis. By whatever method formed, the film should be laid down at the optimum temperature of the substrate, e.g., 600° C. to 700° C. for silicon film and 400° C to 500° C. for germanium film. When deposition is not effected in vacuum, contamination of the film material during deposition should be prevented; especially steps should be taken to exclude oxygen. It is contemplated, however, that suitable additives may be employed to modify the properties of the film without departing from the invention. It is also specifically contemplated that mixtures of silicon and germanium may be employed as the semiconductor film material.

Film thicknesses in the range between 0.1 and 5.0 microns are particularly useful in semiconductor film resistors.

Electrical terminals may be formed upon the film-type resistors by means of coatings of silver-epoxy paste, or fired platinum terminations may be applied, or other known methods of termination may be used.

The finished resistors may be encapsulated, as by dipping or spraying with a resin or other suitable coating material, by known methods, in order to protect the film from moisture, dirt, and abrasion.

While an illustrative form of apparatus and methods in accordance with the invention have been described and shown herein, it will be understood that numerous changes may be made without departing from the general principle and scope of the invention.

What is claimed is:

1. A resistor comprising a film of thickness in the range between 0.1 and 5.0 microns consisting essentially of a semiconductor selected from the group of elements consisting of silicon and germanium, and mixture thereof.

2. A resistor according to claim 1, in which the said semiconductor is silicon.

3. A resistor according to claim 1, in which the said semiconductor is germanium.

4. A resistor comprising a film of thickness in the range between 0.1 and 5.0 microns consisting essentially of a mixture of silicon and germanium.

5. The method of making a film-type silicon resistor possessing a relatively low value of temperature coefficient of resistance in the finished form after deposition of the film and cooling to room temperature, which method comprises the steps of heating a substrate to a temperature in the range between 600° C. and 700° C., and depositing by gas deposition a layer of substantially pure silicon upon said substrate while the latter is held within said temperature range.

6. The method according to claim 5, in which the said steps are carried out in a vacuum pressure of $5\times10^{-5}$ millimeters of mercury or less.

7. The method according to claim 5, in which the depositing step is carried out while the substrate is held at the temperature of substantially 650° C.

8. The method of making a film-type germanium resistor possessing a relatively low value of temperature coefficient of resistance in the finished form after deposition of the film and cooling to room temperature, which method comprises the steps of heating a substrate to a temperature in the range between 400° C. and 500° C., and depositing by gas deposition a layer of substantially pure germanium upon said substrate while the latter is held within said temperature range.

9. The method according to claim 8, in which the said steps are carried out in a vacuum pressure of $5\times10^{-5}$ millimeters of mercury or less.

10. The method according to claim 8, in which the depositing step is carried out while the substrate is held at the temperature of substantially 450° C.

11. The method of making a film type resistor by depositing a film of resistive material consisting essentially of a semiconductor selected from the group consisting of silicon, germanium, and mixtures thereof, upon an insulating substrate, which method comprises the steps of heating said substrate to a temperature in a range conducive to producing a resistive film possessing a low value of temperature coefficient of resistance after deposition and cooling to room temperature, said temperature range for silicon being from 500° C. to 1000° C. and for germanium being from about 300° C. to 800° C., and depositing by gas deposition a film of said resistive material upon said substrate while the latter is held within said temperature range.

12. The method according to claim 11, in which the resistive material to be deposited is evaporated from a container of a substance which will not materially enter into combination with the said resistive material at the evaporating temperature of the said resistive material.

13. The method according to claim 11, in which the resistive material to be deposited is evaporated from a container consisting essentially of boron nitride.

References Cited by the Examiner

UNITED STATES PATENTS

| | | | |
|---|---|---|---|
| 2,552,626 | 5/1951 | Fisher et al. | 117—107.2 X |
| 2,872,327 | 2/1959 | Taylor | 117—107 |
| 3,015,587 | 1/1962 | MacDonald | 117—213 |
| 3,063,858 | 11/1962 | Steeves | 117—107 X |

FOREIGN PATENTS

| | | |
|---|---|---|
| 627,175 | 9/1961 | Canada. |
| 407,111 | 12/1924 | Germany. |
| 1,043,537 | 11/1958 | Germany. |

JOSEPH B. SPENCER, *Primary Examiner.*

RICHARD D. NEVIUS, *Examiner.*